US010309711B2

(12) United States Patent
Casasanta

(10) Patent No.: US 10,309,711 B2
(45) Date of Patent: Jun. 4, 2019

(54) AERODYNAMIC COVER FOR TRANSPORT REFRIGERATION UNIT

(71) Applicant: Carrier Corporation, Farmington, CT (US)

(72) Inventor: James Casasanta, Auburn, NY (US)

(73) Assignee: CARRIER CORPORATION, Farmington, CT (US)

( * ) Notice: Subject to any disclaimer, the term of this patent is extended or adjusted under 35 U.S.C. 154(b) by 662 days.

(21) Appl. No.: 14/638,028

(22) Filed: Mar. 4, 2015

(65) Prior Publication Data

US 2015/0253058 A1 Sep. 10, 2015

Related U.S. Application Data

(60) Provisional application No. 61/948,259, filed on Mar. 5, 2014.

(51) Int. Cl.
*F25D 17/08* (2006.01)
*F25D 11/00* (2006.01)
*B62D 35/00* (2006.01)
*F25B 27/00* (2006.01)

(52) U.S. Cl.
CPC .......... *F25D 11/003* (2013.01); *B62D 35/001* (2013.01); *F25D 17/08* (2013.01); *F25B 27/00* (2013.01); *F25B 2327/001* (2013.01)

(58) Field of Classification Search
CPC ........ B60P 3/20; F25D 19/003; F25D 11/003; F25D 17/08; B60H 1/00371; B62D 35/001; F25B 27/00; F25B 2327/001

USPC ............................ 62/239, 244, 428, 263, 243
See application file for complete search history.

(56) References Cited

U.S. PATENT DOCUMENTS

| | | | |
|---|---|---|---|
| 4,021,069 A | 5/1977 | Hersh | |
| 4,022,508 A | 5/1977 | Kirsch et al. | |
| 4,030,779 A | 6/1977 | Johnson | |
| 4,078,395 A * | 3/1978 | Crowe | B60P 3/20 296/180.4 |
| 4,103,957 A | 8/1978 | Jenney et al. | |
| 4,257,240 A * | 3/1981 | Christiansen | B60H 1/3226 62/237 |
| 4,348,871 A * | 9/1982 | Androff | B60H 1/3226 62/239 |

(Continued)

FOREIGN PATENT DOCUMENTS

| | | |
|---|---|---|
| WO | 8501485 | 4/1985 |
| WO | 2008033725 | 3/2008 |

*Primary Examiner* — Melvin Jones
(74) *Attorney, Agent, or Firm* — Cantor Colburn LLP

(57) ABSTRACT

A refrigerated truck transportation system includes a transportation cargo container and a refrigeration unit secured to a front wall of the transportation cargo container to provide a flow of supply air for the transportation cargo container. The refrigeration unit includes a compressor and a refrigeration engine operably connected to the compressor to drive the compressor. The compressor and the engine are located in a refrigeration unit housing. A housing cover is located at an upper portion of the refrigeration unit housing. The housing cover has a lower extent located at the refrigeration unit housing and an upper extent located at a top wall of the transportation cargo container and configured to direct an airflow over the top wall thereby reducing turbulence in the airflow.

18 Claims, 5 Drawing Sheets

(56) References Cited

U.S. PATENT DOCUMENTS

| | | | |
|---|---|---|---|
| 4,553,584 A * | 11/1985 | Bloomquist | B60H 1/00014 165/263 |
| 4,553,782 A | 11/1985 | Markland | |
| 5,129,235 A * | 7/1992 | Renken | B60H 1/3232 454/90 |
| 5,927,090 A * | 7/1999 | Ladendorf | B60H 1/3232 296/24.35 |
| 6,422,034 B2 | 7/2002 | Gehman et al. | |
| 7,059,146 B2 * | 6/2006 | Nakajima | B60H 1/00514 62/239 |
| 8,181,476 B2 * | 5/2012 | Khan | B60P 3/20 62/244 |
| 8,506,004 B1 | 8/2013 | Vogel et al. | |
| 2012/0261946 A1 | 10/2012 | Steel | |
| 2013/0038086 A1 | 2/2013 | Breidenbach | |
| 2013/0113235 A1 | 5/2013 | Henderson et al. | |
| 2013/0158828 A1 | 6/2013 | McAlister | |
| 2013/0181479 A1 | 7/2013 | Smith | |
| 2013/0214557 A1 | 8/2013 | Smith et al. | |

* cited by examiner

US 10,309,711 B2

AERODYNAMIC COVER FOR TRANSPORT REFRIGERATION UNIT

BACKGROUND OF THE INVENTION

The subject matter disclosed herein relates to refrigeration systems. More specifically, the subject matter disclosed herein relates to refrigeration of trucks, trailers and containers utilized to store and ship cargo.

A typical refrigerated cargo truck or refrigerated truck trailer, such as those utilized to transport a cargo via sea, rail or road, is a truck or trailer having a cargo compartment, modified to include a refrigeration unit located at one end of the truck or trailer. The refrigeration unit includes a compressor, condenser, expansion valve and evaporator serially connected by refrigerant lines in a closed refrigerant circuit in accord with known refrigerant vapor compression cycles. A power unit, including an engine, drives the compressor of the refrigeration unit, and is typically diesel powered, or in other applications natural gas powered. In many truck/trailer transport refrigeration systems, the compressor is driven by the engine shaft either through a belt drive or by a mechanical shaft-to-shaft link. In other systems, the engine drives a generator that generates electrical power, which in turn drives the compressor.

Manufacturers and operators of fleets of refrigerated trucks and refrigerated truck trailers desire to maximize operational efficiency of not only the refrigeration unit, but of the truck or tractor trailer system as a whole.

BRIEF DESCRIPTION OF THE INVENTION

In one embodiment, a refrigerated truck transportation system includes a transportation cargo container and a refrigeration unit secured to a front wall of the transportation cargo container to provide a flow of supply air for the transportation cargo container. The refrigeration unit includes a compressor and a refrigeration engine operably connected to the compressor to drive the compressor. The compressor and the engine are located in a refrigeration unit housing. A housing cover is located at an upper portion of the refrigeration unit housing. The housing cover has a lower extent located at the refrigeration unit housing and an upper extent located at a top wall of the transportation cargo container and configured to direct an airflow over the top wall thereby reducing turbulence in the airflow.

In another embodiment, a tractor trailer system includes a tractor including a drivetrain for the tractor trailer system and a trailer coupled to the tractor. The trailer includes a cargo compartment and a refrigeration unit positioned between the cargo compartment and the tractor to provide a flow of supply air for the cargo compartment. The refrigeration unit includes a compressor and a refrigeration engine operably connected to the compressor to drive the compressor. The compressor and the engine are located in a refrigeration unit housing. A housing cover is located an upper portion of the refrigeration unit housing. The housing cover has a lower extent located at the refrigeration unit housing and an upper extent located at a top wall of the trailer and configured to direct an airflow over the top wall thereby reducing turbulence in the airflow and improving fuel efficiency of the tractor trailer system.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
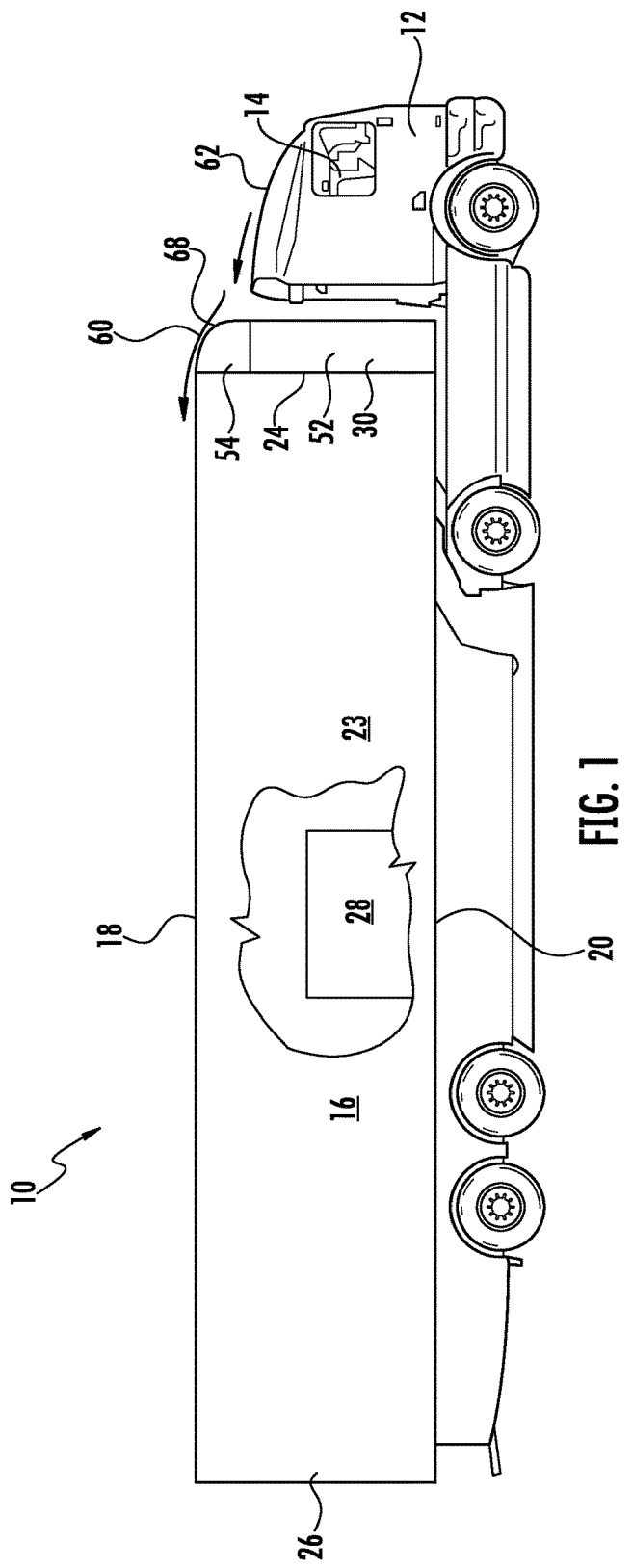
FIG. 1 is a schematic view of an embodiment of a tractor trailer system.

The detailed description explains embodiments of the invention, together with advantages and features, by way of example with reference to the drawing.

DETAILED DESCRIPTION OF THE INVENTION

Shown in FIG. 1 is a schematic of an embodiment of a tractor trailer system 10. The tractor trailer system 10 includes a tractor 12 including a operator's compartment or cab 14 and also including an engine (not shown), which acts as the drivetrain system of the tractor trailer system 10. A trailer 16 is coupled to the tractor 12. The trailer 16 is a refrigerated trailer 16 and includes a top wall 18, a directly opposed bottom wall 20, opposed side walls 22 and a front wall 24, with the front wall 24 being closest to the tractor 12. The trailer 16 further includes a door or doors (not shown) at a rear wall 26, opposite the front wall 24. The trailer 16 is configured to maintain a cargo 28 located inside the trailer 16 at a selected temperature through the use of a refrigeration unit 30 located at the trailer 16. The refrigeration unit 30 is located at the front wall 24, and referring now to FIG. 2, includes a compressor 32, a condenser 34, an expansion valve 36, an evaporator 38 and an evaporator fan 40. The compressor 32 is operably connected to a refrigeration engine 42 which drives the compressor 32. The refrigeration engine 42 is connected to the compressor in one of several ways, such as a direct shaft drive, a belt drive, one or more clutches, or via an electrical generator. Return airflow 44 flows into the refrigeration unit 30 from the trailer 16 through a refrigeration unit inlet 46, and across the evaporator 38 via the evaporator fan 40, thus cooling the return airflow 44 to a selected temperature. The cooled return airflow 44, now referred to as supply airflow 48 is then supplied into the trailer 16 through a refrigeration unit outlet 50, which in some embodiments is located near the top wall 18 of the trailer 16. The supply airflow 48 cools the cargo 28 in the trailer 16. It is to be appreciated that the refrigeration unit 30 can further be operated in reverse to warm the trailer 16 when, for example, the outside temperature is very low.

Figure 2:
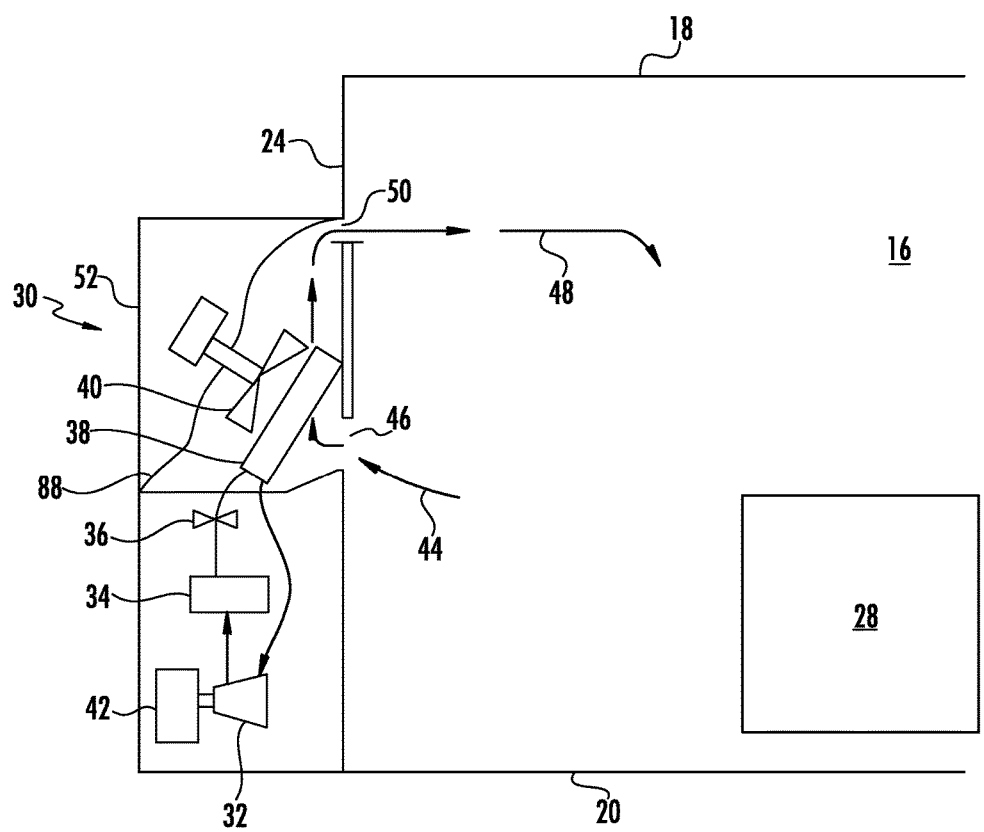
FIG. 2 is a schematic view of an embodiment of a refrigeration unit for a cargo compartment of a tractor trailer system.
Figure 3:
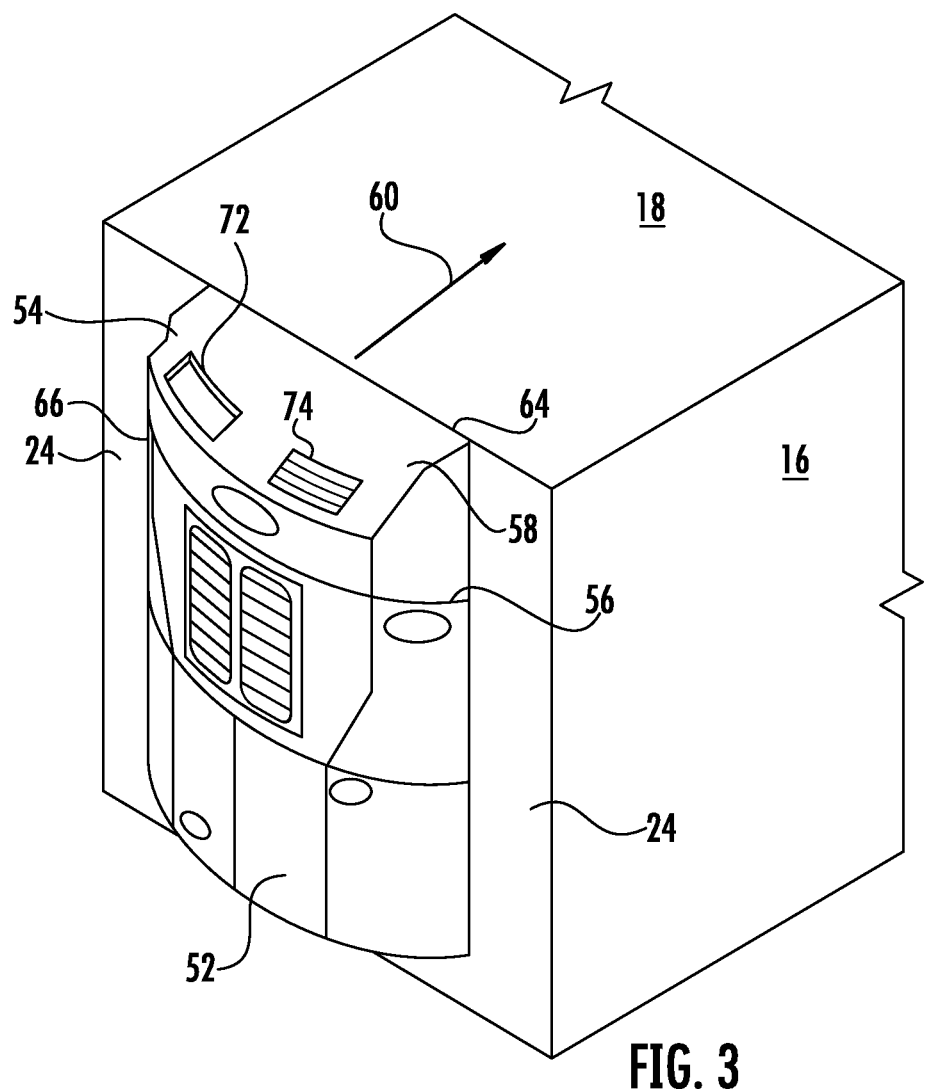
FIG. 3 is another schematic view of an embodiment of a refrigeration unit for a cargo compartment of a tractor trailer system.

Referring to FIG. 2, the refrigeration unit 30 is positioned in a frame 88 and contained in an accessible housing 52, with the frame 88 and/or the housing 52 secured to an exterior side of the front wall 24 such that the refrigeration unit 30 is positioned between the front wall 24 and the tractor 12, shown in FIG. 1. Aerodynamic performance of the tractor trailer system 10 (FIG. 1) can have a significant impact on fuel efficiency of the tractor trailer system 10. In a traditional tractor trailer, the front wall is a vertical wall extending upward past a top of the tractor, thus resulting in turbulent airflow in this area between the tractor and trailer, significantly impacting aerodynamic performance and thus fuel efficiency of the tractor trailer. Referring now to FIG. 3, to improve the aerodynamic performance, the housing 52 has a cover 54 affixed thereto, specifically to the housing top 56 of the housing 52. Alternatively, in other embodiments, the cover 54 is affixed to the trailer 16, for example, the front wall 24 of the trailer 16. The cover 54 extends from the housing top 56 to the top wall 18 of the trailer 16, with an outer cover surface 58 shaped and positioned to direct an airflow 60 flowing over a tractor top 62 to the top wall 18 of the trailer 16, as shown in FIG. 1. For example, in some embodiments an upper extent 64 of the outer cover surface 58 is at a same height as the top wall 18, while a lower extent 66 of the outer cover surface 58 is at the housing 52. In some embodiments, between the upper extent 64 and the lower extent 66, the outer cover surface 58 comprises a single continuous convex radius 68 to smoothly direct the airflow 60 over the top wall 18. In other embodiments, other shapes may be utilized, for example, ones having multiple radii of curvature. In using the cover 54, the airflow 60 between the tractor 12 and the trailer 16 remains laminar for a longer duration, and turbulence in the airflow 60 is reduced compared to configurations without a cover 54. While the single radius 68 is shown in FIG. 1, it is to be appreciate that other aerodynamic shapes may be utilized in forming the outer cover surface 58.

Figure 4:
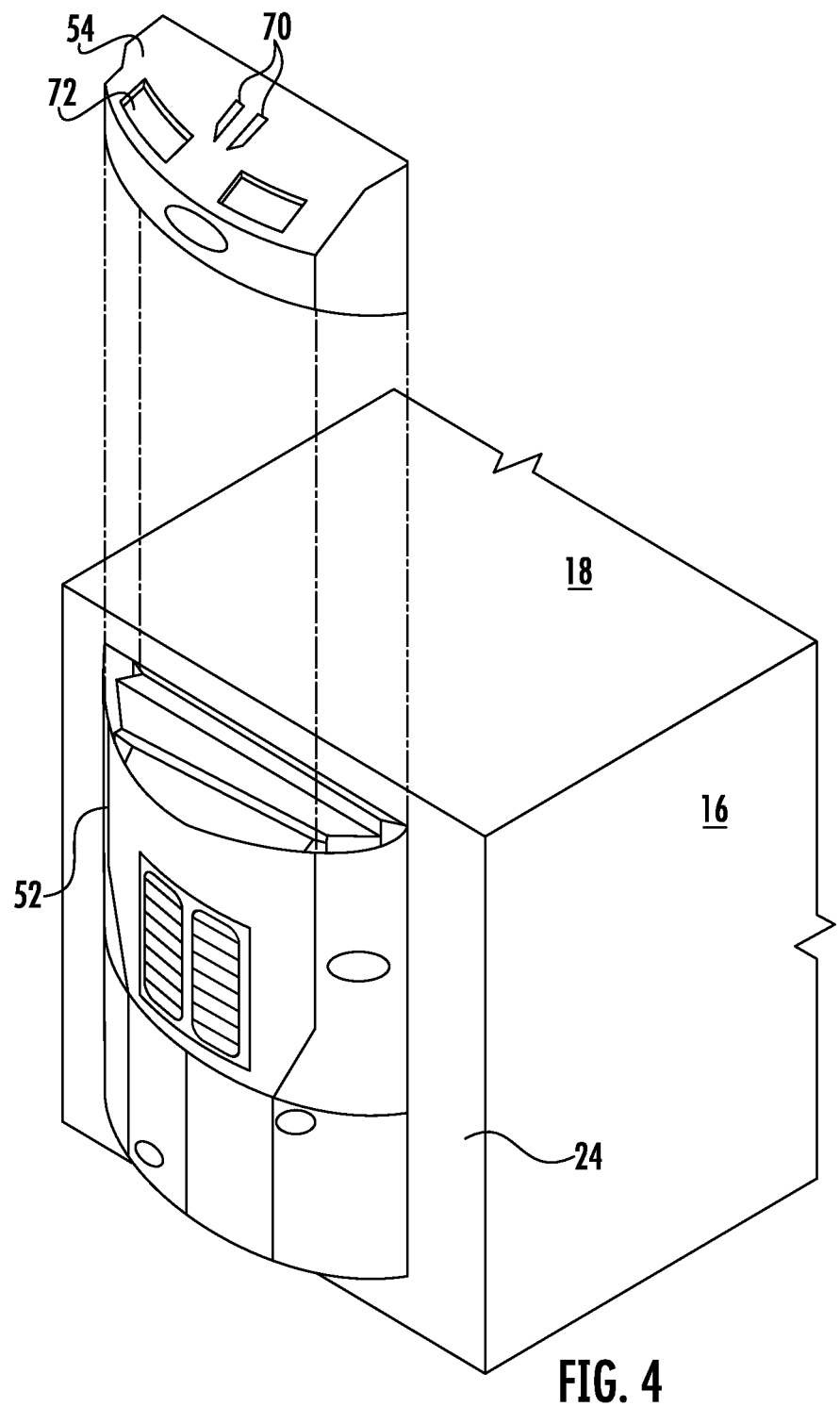
FIG. 4 is a partially exploded view of another embodiment of a tractor trailer system.

In some embodiments, as shown in FIG. 4, to further improve performance of the cover 54, one or more vortex generators 70 are included at the outer cover surface 58. The vortex generators 70 are aerodynamic structures extending from the outer cover surface 58 airframe into the airflow 60, and may have a cross-section that is, for example, rectangular, circular, or airfoil shaped. It is to be appreciated that the listed shapes are merely exemplary, and that other cross-sectional shapes may be utilized. The vortex generators 70 create a tip vortices that draw energetic, rapidly-moving air from outside the slow-moving boundary layer into contact with the cover 54, thus reenergizing the boundary layer and reducing drag over the cover 54. Further, in some embodiments, the cover 54 includes vents 72 and/or louvers 74 or other openings to vent heat from the refrigeration unit 30, for example from the condenser 34 and/or exhaust from the refrigeration engine 42. In other embodiments, such openings may be utilized as air intakes for the refrigeration engine 42. In some embodiments, the vents 72 are configured to prevent ingress of foreign matter, such as snow, into the air intake. Further, in cold weather and snowy environments, the curvature of the outer cover surface 58 prevents snow buildup on the refrigeration unit 30 further enhancing performance of the refrigeration unit 30 in such conditions.

Referring now to FIG. 4, the cover 54 is formed from light weight, high strength materials, such as a plastic, aluminum or composite material. Further, the cover may be formed from a fire retardant material and/or have a fire retardant coating. The cover 54 is assembled to the housing 52 by a snap fit or friction fit as shown to reduce the complexity of assembly, or may alternatively be installed utilizing mechanical fasteners such as bolts or screws.

Figure 5:
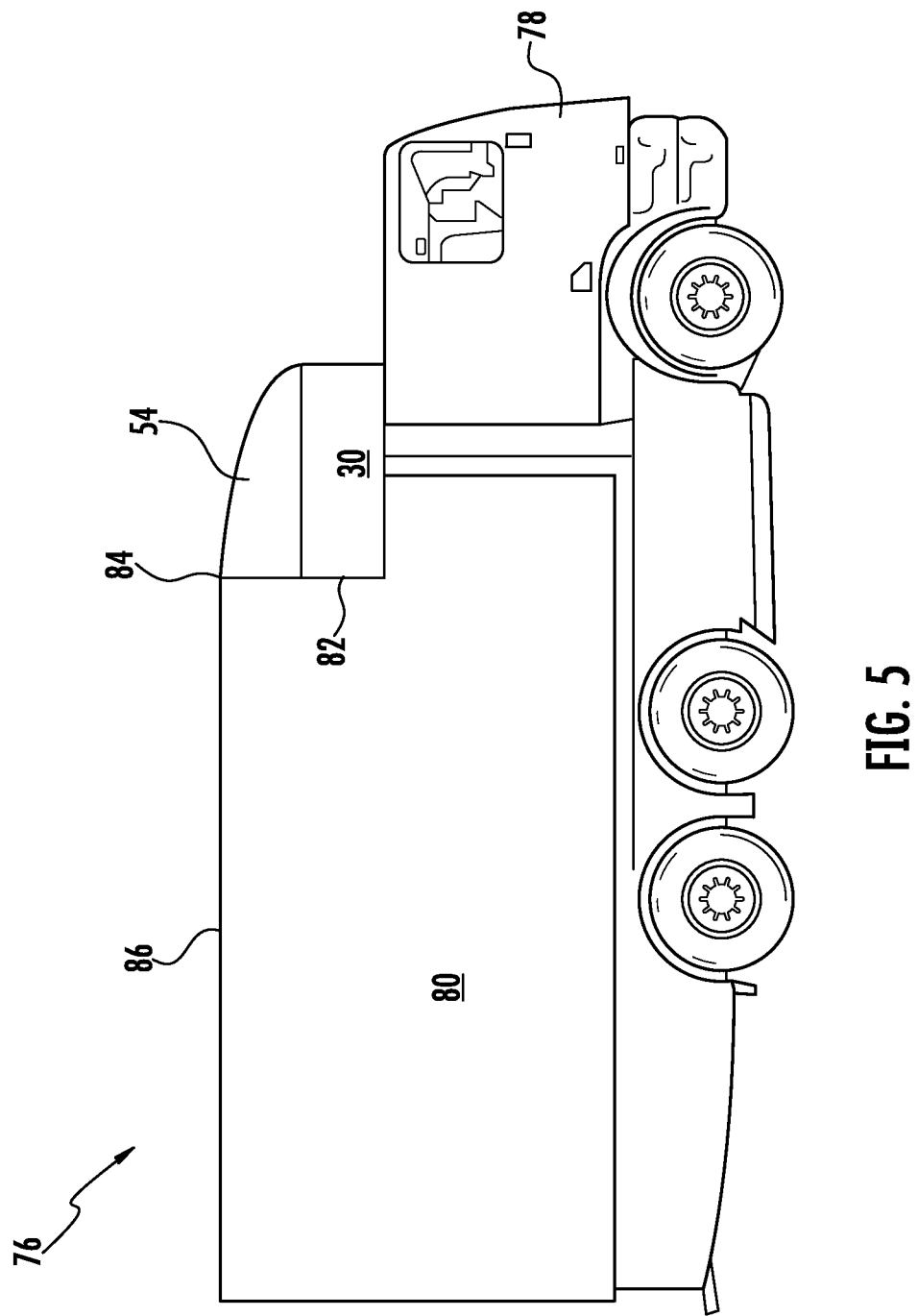
FIG. 5 is a schematic view of an embodiment of a refrigerated truck system.

Referring now to FIG. 5, while to this point embodiments have been described for configurations of tractor trailer systems 10, in some embodiments the cover 54 is adapted for use on a truck system 76. The truck system includes a cab 78 and cargo compartment 80, with the refrigeration unit 30 secured to a front wall 82 of the cargo compartment 80. The cover 54 is secured to the refrigeration unit 30, with an upper extent 84 disposed at a top wall 86 of the cargo compartment 80.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A refrigerated truck transportation system comprising:
 a transportation cargo container; and
 a refrigeration unit secured to a front wall of the transportation cargo container to provide a flow of supply air for the transportation cargo container, the refrigeration unit including:
  a compressor; and
  a refrigeration engine powered operably connected to the compressor to drive the compressor, the compressor and the refrigeration engine disposed in a refrigeration unit housing; and
 a housing cover disposed at an upper portion of the refrigeration unit housing, the housing cover having a lower extent disposed at the refrigeration unit housing and an upper extent disposed at a top wall of the transportation cargo container and configured to direct an airflow over the top wall thereby reducing turbulence in the airflow;
 wherein the housing cover comprises a single continuous convex radius between the lower extent and the upper extent.

2. The refrigerated truck transportation system of claim 1, further comprising a vortex generator disposed at an outer cover surface of the housing cover.

3. The refrigerated truck transportation system of claim 1, further comprising a vent disposed at an outer cover surface of the housing cover to dissipate heat from the refrigeration unit.

4. The refrigerated truck transportation system of claim 1, further comprising an inlet in an outer cover surface of the housing cover to supply airflow to the refrigeration engine.

5. The refrigerated truck transportation system of claim 4, further comprising an inlet cover to prevent ingress of foreign matter into the inlet.

6. The refrigerated truck transportation system of claim 1, wherein the housing cover is formed from a fire retardant material and/or includes a fire retardant coating.

7. The refrigerated truck transportation system of claim 1, wherein the housing cover is secured to the refrigeration unit housing.

8. The refrigerated truck transportation system of claim 7, wherein the housing cover is secured to the refrigeration unit housing by one of a snap fit or friction fit.

9. A tractor trailer system comprising:
 a tractor including a drivetrain for the tractor trailer system;
 a trailer coupled to the tractor including:
  a cargo compartment; and a refrigeration unit disposed between the cargo compartment and the tractor to provide a flow of supply air for the cargo compartment, the refrigeration unit including:
  a compressor; and
  a refrigeration engine operably connected to the compressor to drive the compressor, the compressor and the refrigeration engine disposed in a refrigeration unit housing; and
a housing cover disposed at an upper portion of the refrigeration unit housing, the housing cover having a lower extent disposed at the refrigeration unit housing and an upper extent disposed at a top wall of the trailer and configured to direct an airflow over the top wall thereby reducing turbulence in the airflow and improving fuel efficiency of the tractor trailer system.

10. The tractor trailer system of claim 9, wherein the refrigeration unit is secured to an exterior of the cargo compartment.

11. The tractor trailer system of claim 9, wherein the housing cover comprises a single continuous convex radius between the lower extent and the upper extent.

12. The tractor trailer system of claim 9, further comprising a vortex generator disposed at an outer cover surface of the housing cover.

13. The tractor trailer system of claim 9, further comprising a vent disposed at an outer cover surface of the housing cover to dissipate heat from the refrigeration unit.

14. The tractor trailer system of claim 9, further comprising an inlet in an outer cover surface of the housing cover to supply airflow to the refrigeration engine.

15. The tractor trailer system of claim 14, further comprising an inlet cover to prevent ingress of foreign matter into the inlet.

16. The tractor trailer system of claim 9, wherein the housing cover is formed from a fire retardant material and/or includes a fire retardant coating.

17. The tractor trailer system of claim 9, wherein the housing cover is secured to the refrigeration unit housing.

18. The tractor trailer system of claim 17, wherein the housing cover is secured to the refrigeration unit housing by one of a snap fit or friction fit.

* * * * *